Oct. 4, 1932.  W. S. ELLIOT ET AL  1,880,935
BLANK CUTTING MACHINE
Filed Aug. 2, 1929    4 Sheets-Sheet 4
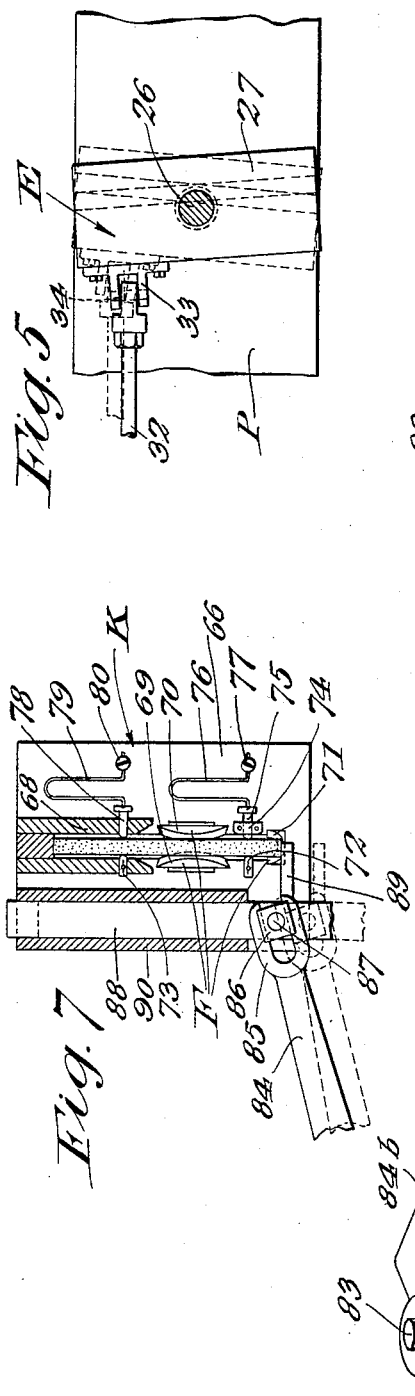
Inventors:
William S. Elliot
Frederic A. Parkhurst
By Macleod Calver Copeland & Dike
Attorneys.

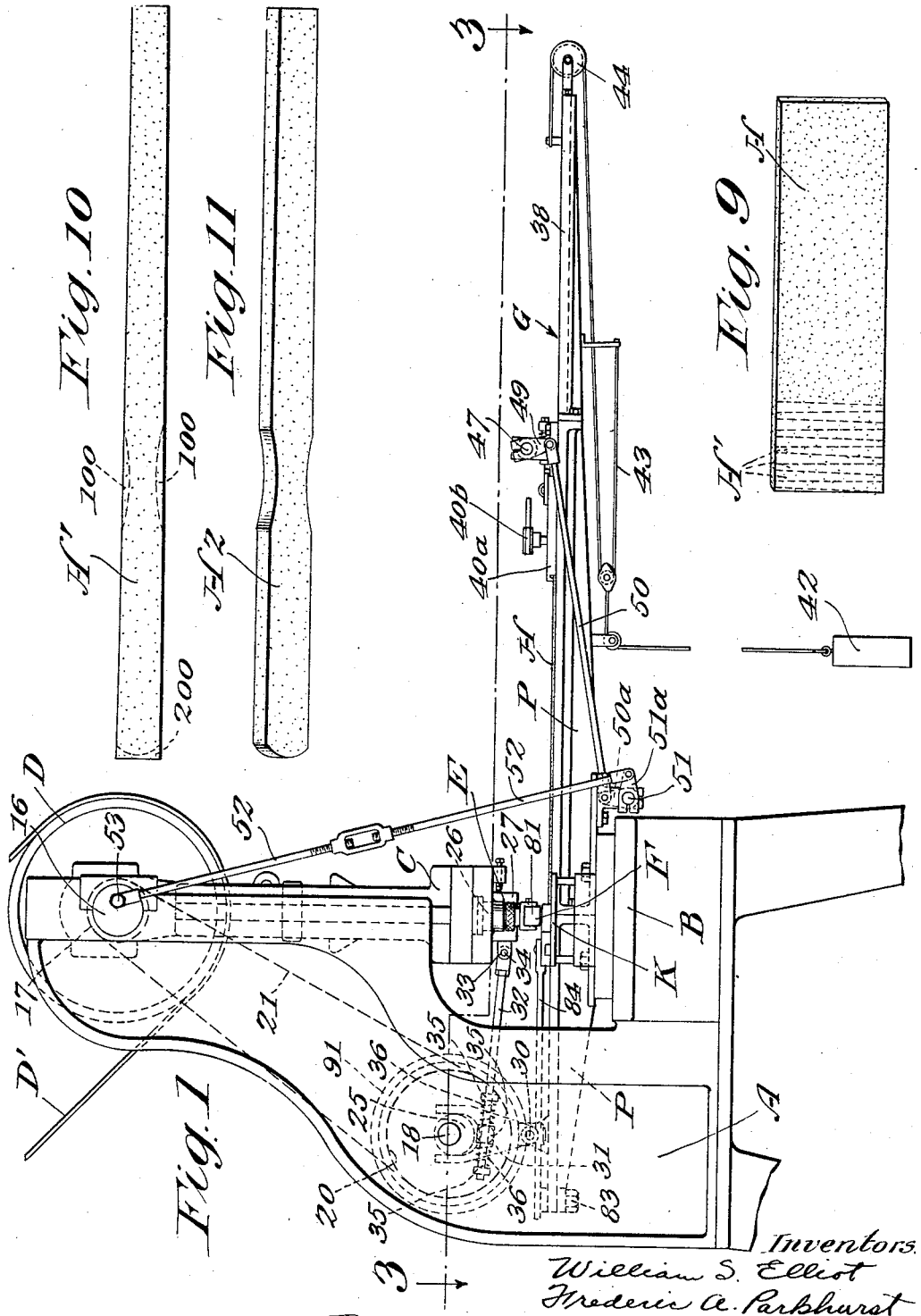

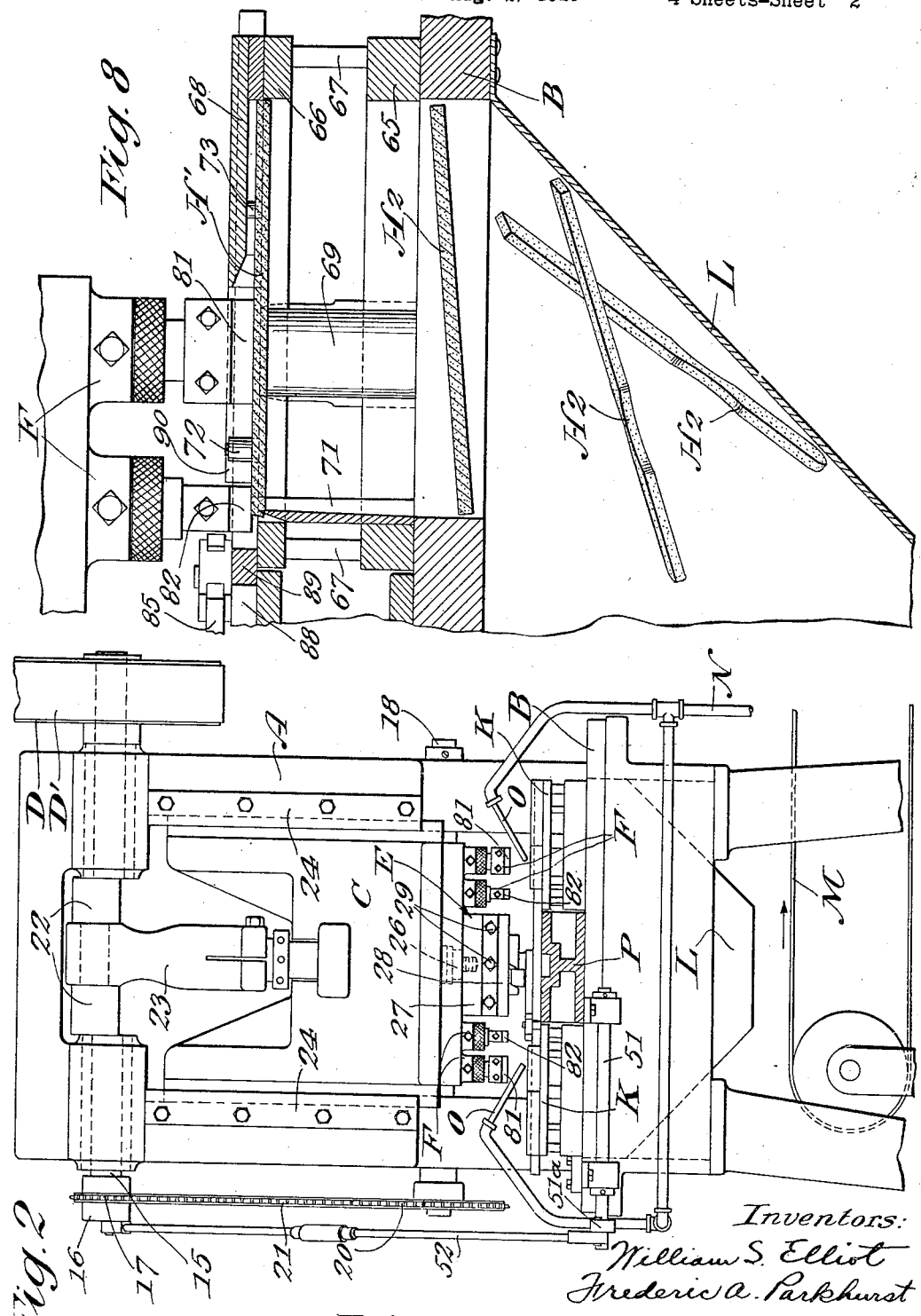

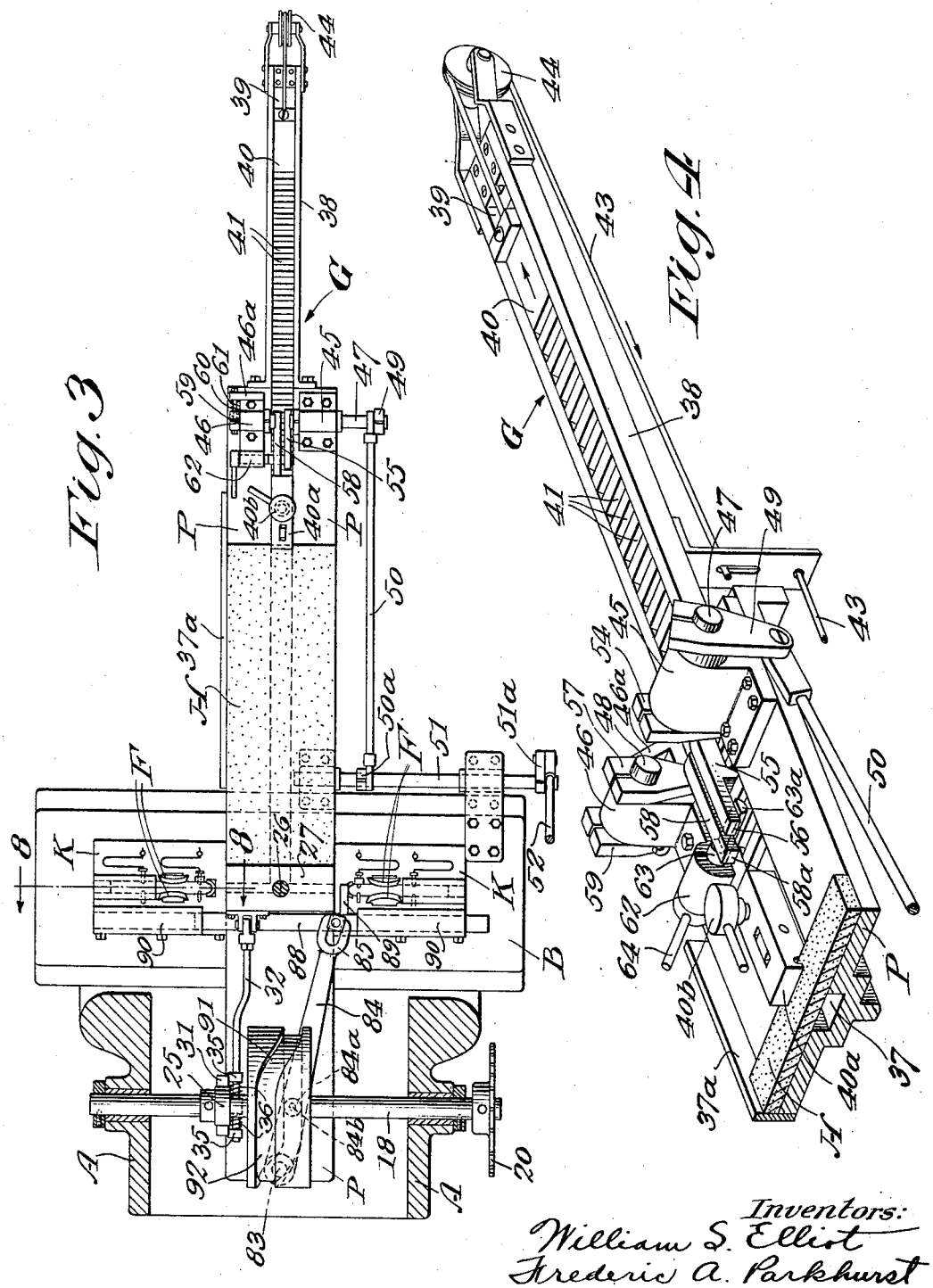

Patented Oct. 4, 1932

1,880,935

UNITED STATES PATENT OFFICE

WILLIAM S. ELLIOT, OF NORTHAMPTON, MASSACHUSETTS, AND FREDERIC A. PARKHURST, OF BETHESDA, MARYLAND, ASSIGNORS, BY MESNE ASSIGNMENTS, TO PRO-PHY-LAC-TIC BRUSH COMPANY, OF WILMINGTON, DELAWARE, A CORPORATION OF DELAWARE

BLANK CUTTING MACHINE

Application filed August 2, 1929. Serial No. 383,068.

This invention relates to a machine for forming tooth brush handles from sheets or slabs of pyroxylin or other similar material.

Heretofore it has been common practice to cut from sheets or slabs of pyroxylin, rectangular blanks which were subsequently placed in rolls or pressure dies to form finished handles from the blanks. It was desirable to taper the handles and this caused a considerable waste of material during the molding operation due to the fact that the mass of material in the blank before molding was considerably greater than the mass of material in the finished handle, with a resultant large fin or flash formed from the surplus material.

We have discovered that a great saving of material can be effected by cutting from the slab or sheet blanks more nearly conforming in size and shape to the finished handle. It is therefore an object of our invention to provide a machine capable of forming handle blanks of substantially the general size and shape of a finished tooth brush handle. Another object is to provide a machine capable of cutting from a slab of material oppositely tapered blanks having the foregoing characteristics thereby minimizing the waste of material.

Other objects of our invention will appear from the following description and appended claims when considered in connection with the accompanying drawings, in which Fig. 1 is a side elevation of the machine of our invention.

Fig. 2 is a front elevation of the machine of Fig. 1.

Fig. 3 is a sectional top plan view taken substantially on the line 3—3 of Fig. 1.

Fig. 4 is a detail perspective view of the feed mechanism.

Fig. 5 is a detail plan view, partly in section, showing the different positions of the knife carrying block.

Fig. 6 is a fragmentary perspective view of a part of the machine showing the mechanism for feeding the cut blanks to the dies.

Fig. 7 is a detail plan view, partly in section, of one of the dies and blank feeding mechanism.

Fig. 8 is a section taken substantially along the line 8—8 of Fig. 3.

Fig. 9 is a perspective view of the slab or sheet of material showing in broken lines the manner in which the blanks are cut.

Fig. 10 is a plan view of one of the handle blanks; and

Fig. 11 is a perspective view of one of the finished handle blanks.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Complete operation

The operation of our machine which is to be described in detail below is substantially as follows: With the slab feeding mechanism positioned as it is shown in Figs. 3 and 4 a slab or sheet of pyroxylin is placed in position upon the platform and fed by a step by step movement to the reciprocating and swinging knife carried by the ram. The knife descends and cuts a tapered blank from the slab while on the ascent of the knife mechanism functions to transfer the cut blank to a pair of dinking dies at one side of the machine. The knife is now swung to change its position and on the next down stroke of the ram the knife cuts an oppositely tapered blank from the slab and simultaneously dinks out the previously cut blank at the right side of the dies. On the second up stroke of the ram, the second cut blank is transferred to a pair of dinking dies at the left side of the machine, the knife shifted and on the next downward movement of the ram a third blank is cut from the sheet and the second cut blank is dinked out by the dinking dies at the left of the machine. This operation is repeated until oppositely tapered blanks have been cut from the entire sheet of material, whereupon the sheet feed is released and a new sheet or slab of material inserted.

General assembly

The machine of our invention comprises a plurality of units including a frame A having a bed B, a central longitudinal platform P, side platforms K, a ram C, and power means preferably comprising a driven pulley D. The ram carries a blanking tool block and tool shown as a whole at E and the upper members of a pair of forming tools F, the lower members of these forming tools being supported by the platforms K. The forming tools are arranged in reverse symmetry. The slab feeding unit is shown as a whole at G and is constructed to impart a step by step feeding movement to the slab H. The power means includes, in addition to the pulley D, independent units operated from the pulley for feeding the slab to the blanking tool and for feeding the cut blanks to the forming tools, as well as for oscillating the blanking tool. This mechanism will be described in detail below.

Drive mechanism

In Figs. 1 and 2 it will be observed that the frame A supports at its upper end a rotary shaft 15 upon one end of which is mounted the power pulley D. This pulley receives its power from any suitable source by means of the belt D'. Upon the opposite end of the shaft 15 there is mounted a smaller sleeve 16 which carries a sprocket 17. Supported by the frame at a point above the bed B is a second shaft 18 having upon one end a sprocket 20. A sprocket chain 21 connects the sprockets 17 and 20. The shaft 15 carries an eccentrically mounted sleeve 22 to which a pitman 23 is connected, the pitman supporting the ram C. To maintain the ram in a single vertical plane during its reciprocation, the machine frame is provided with guides 24 which are detachably mounted upon the frame. In Fig. 1 it will be seen that the shaft 18 carries an eccentric 25.

Blanking tool and supporting block

The lower end of the ram has secured to it as by means of a screw 26 a knife carrying block 27 which is mounted to swivel with respect to the ram. The knife block carries a knife 28 which is detachably connected to it by means of screws 29. In Fig. 5 the knife block is shown in its several positions. Mounted at the rear of the ram and pivotally connected to the base at 30 is a yoke 31. This yoke straddles the eccentric 25, and is connected by means of a rod 32 with the rear face of the knife block 27 in any suitable manner. As shown, the rod is detachably connected with the block by means of a bracket 33 and a pin 34. A resilient connection is provided between the yoke and the outer end of the rod 32 and comprises three spaced blocks 35 between which blocks springs 36 are interposed the yoke carrying one of the spaced blocks which slides on the rod 32 between the other two blocks. As the shaft 18 is rotated the eccentric causes the yoke to rock about its pivot 30 and oscillate the knife.

Slab feeding mechanism

The feed mechanism previously referred to generally is shown as a whole at G and comprises a central platform P extending from the front to the rear of the machine. Secured to the forward end of the platform P is a bracket 38 having a longitudinal groove or track 39 therein, said groove extending throughout the length of the bracket and registering with a similar groove or trackway 37 formed in the platform to provide a continuation thereof. Positioned within the trackway 39 and adapted to slide therein and into the trackway 37 is a rack 40 provided with a plurality of transverse grooves 41. The rack is normally maintained in its outward position as shown in Fig. 4 by means of a counter-weight 42 connected by a cable 43 to the outer end of the rack, the cable preferably passing about a pulley 44. Mounted upon the platform P adjacent the outer end thereof are a pair of bearings 45 and 46 each of which bearings supports a transverse shaft 47 and 48. The shaft 47 carries at its outer end a crank 49 connected to pulley 16 by means of a rod 50, crank 50a, shaft 51, bell crank 51a and adjustable rods 52. The upper rod 52 is eccentrically mounted at 53 upon the sleeve 16. The opposite end of the shaft 47 carries a crank 54 which supports at its lower end a pawl 55 engaging the transverse notches 41 in the rack. It will be understood that as the shaft 15 rotates, a step by step movement is imparted to the rack through the medium of the pawl 55 and the intermediary connections. The pawl is extended forwardly at 56 for a purpose to be described.

The shaft 48 carries on its inner end a crank 57 connected with a holding pawl 58 and the outer end of the shaft 48 carries a crank 59 which is limited in its forward movement by a short rod 60 mounted in an extension 46a of the bearing 46. A coil spring 61 surrounds the rod, for a purpose to be described below. Referring particularly to Fig. 4, it will be seen that the bearing 46 has a forward extension 62 which receives a short shaft 63 having a handle 64 and a semi-cylindrical extension 63a, which projects beneath the forward extensions 56 and 58a of the pawls and is so positioned as to allow the pawls normally to engage the transverse notches 41. When, however, it is desirable to release the pawls from engagement with the rack to permit its movement in one direction or the other, the handle 64 is moved in a clockwise direction to lift the pawls out of engagement with the rack.

The forward end of the rack 40 is provided with an adjustable clamping block 40a and a tightening screw 40b. The platform P is provided along one edge, preferably the right hand edge, with a guide 37a (Fig. 4).

When it is desired to cut blanks from the slab of pyroxylin or other material, a sheet or slab of said material of the desired size is placed upon the platform P with one edge against the guide 37a, whereupon the clamp 40a is tightened to grip the rear end of the slab and hold it in place. When the machine is operated the slab is fed forward to the knife 28 step by step, the mechanism previously described serving to reciprocate the knife and oscillate it so as to cut from the slab H the oppositely tapered blanks H' (Fig. 9). When the knife enters the slab, it will be understood that there must be some movement of the mass or the remainder of the slab. The holding pawl 58 being resiliently supported by the short rod 60 and spring 61 permits the slab to have a slight rearward movement as the cutting knife enters the slab to cut off a blank.

The forming tools

At opposite sides of the platform P, and upon the bed of the machine are auxiliary platforms K which support the lower members of the forming tools or, as shown, dinking dies F. Each platform comprises preferably a base plate or block 65 and a top plate 66 supported by means of vertical studs or pins 67. The top plate 66 is provided with an inverted U-shaped guide or hood 68. The lower dinking dies F comprise oppositely disposed members 69 and 70 and an end member 71. The top plate 66 is provided with an adjustable guide block or button 72 and the rear wall of the guide or channel 68 is provided with a similar guide block or button 73. Positioned at a point opposite the guide block 72 is another guide block 74 having a transverse hole or slot therein to receive the pin 75 carried by a U-shaped spring 76 mounted upon the top plate 66 by means of a screw 77. As seen in Fig. 7, the pin 75 projects through the slot or hole in the guide block 74. The front wall of the guide or channel 68 is provided with a transverse hole or slot to receive a pin 78 carried upon the U-shaped spring 79 secured at 80 to the top plate 66. The pins 75 and 78 and their resilient supporting members are identical. Thus it will be seen that a pair of adjustable guides and gripping devices for the blanks is positioned between the die members 69 and 70 and the die member 71 and at the other side of the members 69 and 70 there is provided a similar pair of adjustable guides and blank supports 73 and 78, the latter projecting through the walls and into the interior of the guide or channel 68. The purpose of these combined guides and gripping devices will be fully described below. The platforms K are identical and are so mounted that their die members 69, 70 and 71 cooperate with the die members 81 and 82 carried by the ram C, these latter die members being known as the presser members. It will be observed that the dinking dies are arranged in reverse symmetry to form similar blanks as they are fed to right or left by the transverse feeding means.

Cut blank feeding mechanism

After a slab H has been advanced to the cutter 28, and a blank cut therefrom, it is desirable to transfer this cut blank to the dinking dies forming a part of either of the platforms K. Since the finished handles must all be alike and for the reason that the knife 28 oscillates and cuts oppositely tapered blanks H' on each stroke of the ram, it is necessary to supply the successive alternate blanks to opposite left and right hand dinking dies. We have provided, therefore, mechanism for so feeding the cut blanks. Referring to Fig. 6 it will be noted that the rear extension of the platform P has pivotally mounted thereupon at 83 an arm or lever 84 having a forked forward end 85 supporting a block 86. The block is pivotally connected by means of a pin 87 to a relatively long slide 88 having a substantially centrally located forward extension or projection 89. A guide channel 90 is mounted upon the bed B and serves as a guide for the slide 88. The arm or lever 84 has upon its upper surface a roller 84a mounted by means of a pin 84b.

Referring now to Fig. 3 it will be seen that the lower shaft 18 supports a cam wheel or drum 91 having a cam slot 92 therein. It will be seen that the roller 84a is positioned within the cam slot 92 so that as the cam wheel rotates the roller must necessarily follow the path of the cam slot, thereby causing the arm or lever 84 to swing from side to side in a horizontal plane about its pivot 83. The slot is of such a character as to impart motion to the lever 84 in harmony with the rest of the power operating mechanism and to cause the reciprocation of the slide 88 immediately subsequent to the cutting of a blank, the projection 89 engaging the end of a cut blank to move the same into position between the pairs of guides and holding devices 72 and 74 and 73 and 78 above the dinking dies 69, 70 and 71, on each successive stroke of the machine. The slot is also arranged so as to position the cut blank as described and to retract the projection 89 sufficiently to be out of the path of movement of the knife on its next down stroke. It will be understood, that as the ram descends, carrying the knife to cut a tapered blank, the presser members 81 and 82 of one of the sets of dinking dies serves to force the previously positioned and supported blank H' (Fig. 8) through the lower dinking die members 69, 70 and 71 and allow the same to fall into the hopper L at the base of the machine, the finished handle blanks H2 escape from the hopper and fall onto an endless belt or conveyor M to be carried to any desired point. During the dieing operation, various chips accumulate in the dinking dies. In order to avoid this accumulation, compressed air, supplied to a pipe N, is forced out through the nozzles O (see Fig. 2). Thus it will be seen that the chips are blown out of the dies to leave them clear.

In Fig. 10 there is shown a blank H' after it has been cut from the slab by the cutter 28 and prior to the dinking operation. In Fig. 11 there is shown a finished handle blank H2, the portions shown by the broken lines at 100 and 200, in Fig. 10, having been removed.

Thus it will be seen that the slab of material is fed longitudinally to a swinging and reciprocating knife which cuts oppositely tapered blanks from the slab and feeds them alternately to dinking dies at the right and left hand sides of the machine, the cutting of one blank and the dinking out of a previously cut blank being performed simultaneously. After the slab has been completely cut into blanks, the pawls holding the blank feeding mechanism are released and the mechanism retracted by the counter-weight so as to be in position to receive another slab or sheet of material. It may become desirable at times to cut rectangular rather than tapered blanks from the slab of material. In this case the mechanism for swinging or oscillating the knife can be readily detached so that the knife will travel only in a vertical plane.

We claim:

1. In a blank cutting machine, in combination, a longitudinal feed for feeding a sheet of material, three pairs of cooperating tools arranged transversely of the line of feed of said feeding mechanism and operating at right angles thereto, and transverse feeding mechanism operating to feed the blank formed by the middle pair of said tools alternately to the side pairs of said tools.

2. In a blank cutting machine, in combination, a longitudinal feed for feeding a sheet of material, three pairs of cooperating cutting tools arranged transversely of the line of feed of said feeding mechanism and operating at right angles thereto, and transverse feeding mechanism operating to feed the blank formed by the middle pair of said cutting tools alternately to the side pairs of said tools.

3. In a blank cutting machine, in combination, a longitudinal feed for feeding a sheet of material, three pairs of cooperating tools arranged transversely of the line of feed of said feeding mechanism and operating at right angles thereto, transverse feeding mechanism operating to feed the blank formed by the middle pair of said tools alternately to the side pairs of said tools, and means for causing simultaneous movement of all of said tools.

4. In a blank cutting machine, in combination, a central blanking tool, a longitudinal feed for feeding a sheet of material to said tool, pairs of forming tools arranged at opposite sides of said blanking tool and in alinement therewith, all of said tools operating at right angles to the line of feed of said feeding mechanism, and mechanism operating to feed blanks cut by said blanking tool alternately to said forming tools.

5. In a blank cutting machine, in combination, a central blanking tool, a longitudinal feed for feeding a sheet of material to said tool, pairs of forming tools arranged at opposite sides of said blanking tool and in alinement therewith, all of said tools operating at right angles to the line of feed of said feeding mechanism, mechanism operating to feed blanks cut by said blanking tool alternately to said forming tools, and means for operating the blanking tool and forming tools simultaneously.

6. In a blank cutting machine, in combination, a longitudinal feed for feeding a sheet of material, three pairs of cooperating dies arranged transversely of the line of feed of the feeding mechanism, means for swinging the middle member to form tapered blanks, and transverse feeding mechanism operating to feed the blanks alternately to the side pairs of dies.

7. In a blank cutting machine, in combination, a longitudinal feed for feeding a sheet of material, a knife arranged in the path of movement of said sheet, pairs of dinking dies arranged at opposite sides of the knife and transversely of the line of feed, means for swinging said knife to cut tapered blanks from said sheet, transverse feeding mechanism operating to feed the blank cut by said knife alternately to the pairs of dinking dies, and means for operating the knife and the dinking dies simultaneously.

8. In a blank cutting machine, in combination, a longitudinal feed for feeding a sheet of material, a ram, three die members on the ram arranged transversely to the line of feed of said feeding mechanism, means for swinging the middle member transverse to the mechanism, and means for feeding the blank formed by the middle member alternately to the side members.

9. In a blank cutting machine, in combination, a longitudinal feed for feeding a sheet of material, three pairs of dies arranged transversely of the line of feed of the feeding mechanism, means for swinging the middle member, the two outer members being arranged in reverse symmetry, and transverse feeding means to feed the blank formed by the middle member alternately to the two side members.

10. In a blank cutting machine, in combination, a longitudinal feed for feeding a sheet of material, a ram, three die members on the ram arranged transversely to the line of feed of said feeding mechanism, means for swinging the middle member, the two outer members being arranged in reverse symmetry, and transverse feeding means to feed the blank formed by the middle member alternately to the two side members.

11. In a blank cutting machine, in combination, a central blanking tool, pairs of forming tools arranged at opposite sides of said blanking tool and in alinement therewith, said pairs of forming tools being arranged in reverse symmetry, and transverse feeding means for the cut blanks including a swinging lever and operating means for said lever, the lever being adapted to engage blanks cut by the blanking tool and feed them alternately to said forming tools, said operating means being timed to withdraw the lever from the path of movement of the upper forming tool just prior to the forming operation.

12. In a blank cutting machine, in combination, a central blanking tool, pairs of forming tools arranged at opposite sides of said blanking tool and in alinement therewith, and transverse feeding means for the cut blanks including a swinging lever and operating means for said lever, the lever being adapted to engage blanks cut by the blanking tool and feed them alternately to said forming tools, said operating means being timed to withdraw the lever from the path of movement of the upper forming tool just prior to the forming operation.

In testimony whereof we affix our signatures.

WILLIAM S. ELLIOT.
FREDERIC A. PARKHURST.